(12) United States Patent
Gan et al.

(10) Patent No.: US 8,984,540 B2
(45) Date of Patent: Mar. 17, 2015

(54) MULTI-USER COMPUTER SYSTEM

(75) Inventors: Kuo Chung Gan, Jhubei (TW); Tai Chung Chang, Hsinchu (TW); Lin Ta Chung, Tou Fen Town (TW)

(73) Assignee: Taifatech Inc., Jhubei, Hsinchu County (TW)

( * ) Notice: Subject to any disclaimer, the term of this patent is extended or adjusted under 35 U.S.C. 154(b) by 30 days.

(21) Appl. No.: 13/617,711

(22) Filed: Sep. 14, 2012

(65) Prior Publication Data

US 2014/0082638 A1    Mar. 20, 2014

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/455* | (2006.01) | |

(52) U.S. Cl.
USPC ............... 719/321; 719/318; 719/319; 718/1

(58) Field of Classification Search
None
See application file for complete search history.

(56) References Cited

U.S. PATENT DOCUMENTS

| | | | | |
|---|---|---|---|---|
| 2008/0201751 | A1* | 8/2008 | Ahmed et al. | 725/109 |
| 2011/0119394 | A1* | 5/2011 | Wang et al. | 709/231 |
| 2011/0145886 | A1* | 6/2011 | McKenzie et al. | 726/1 |
| 2011/0179418 | A1* | 7/2011 | Takebe et al. | 718/1 |

* cited by examiner

*Primary Examiner* — Craig Dorais
(74) *Attorney, Agent, or Firm* — Muncy, Geissler, Olds & Lowe, P.C.

(57) ABSTRACT

The present invention provides a multi-user computer system, comprising a master computer with a first wireless module, a virtual graphic driver, a virtual audio driver and a user mode application. At least one virtual computer is included, wherein the at least one virtual comprises a second wireless module for communicating with the first wireless module, a USB connector and a video processing device. The first wireless module and the USB connector are coupled to the video processing device. The virtual graphic driver and the virtual audio driver are coupled to the user mode application for driving USB devices and to enable virtual image/audio data to transmit to the at least one virtual computer.

20 Claims, 8 Drawing Sheets

MULTI-USER COMPUTER SYSTEM

TECHNICAL FIELD

The present invention generally relates to a computer system, more particularly, to a computer system for allowing computer users to use the identical PC with different login.

BACKGROUND

The typical office environment includes personal computers and increasingly more thin clients physically located at the users' locations. These personal computers and thin clients operate on a network having a centralized system for storage, file serving, file sharing, network management and various administrative services. Initially, systems centralized all of the disk storage associated with the computer system while users ran applications on their local desktops. More recently, recognizing the benefits of security, reduced cost of operation, and the general desire for centralizing control, personal computers and thin clients can operate as Remote Terminals (RTs) in Server Based Computing (SBC) solutions which run applications on a server.

In order to provide a computer interface to a human operator, a collection of input and output devices are required. This collection will typically include a video display, a mouse and a keyboard. Keyboards and mice are user interfaces that are used to switch on a computer or input commands to the computer. Optionally, this collection will also include additional devices, such as speakers, microphones, floppy disk drives, CD-ROM drives and additional keyboard devices. For a single user computer, all devices are included in a single collection. For a multi-user system, there will be more than one collection, one for each user. Some method must be used to determine the configuration of these multiple collections.

Moreover, to enhance the communication between the host system and the clients, other systems have used the main CPU of the host system to improve the performance for RTs. This has been done both for thin clients and for traditional PCs as the remote clients. Such approaches have been effective for host systems that support only one user at a time. However, for multi-user systems, the approach of using the main CPU at the host to improve the performance for any one user has significant limitations. Computational resources such as main memory and CPU cycles that are used for optimizations for one user may reduce the ability to support the workload for additional users.

Efficiently supporting multiple users from a single host computer can reduce costs. In a typical office environment, seldom is everyone using their computer at the same time and similarly, seldom is any one user using all of the computing resources of their computer. In a distributed office environment a centralized multi-user system may be connected over varied bandwidth links to support RTs at locations in different parts of the world during the different working hours for the respective time zones.

Server Based Computing, where the applications for users run on the server with only RT services supported at the user's terminal, is another way to more effectively allocate computing resources for multiple users. SBC allows the host system to dynamically allocate shared resources such as memory and CPU cycles in a multi-user operating environment. SBC systems can employ techniques of multi-user operating systems, Virtual Machines (VM), load balancing and other means to grant different users access to different levels of performance and resources based on a number of criteria. Different priority schemes can be used to allocate SBC resources. SBC can achieve higher data security, centralize the support for an organization, enhanced disaster recovery and business continuance, and reduce data storage requirements across an organization. Web servers are one type of SBC which may provide a multi-user platform for a variety of clients including browser based clients.

Therefore, based-on the shortcomings of prior arts, the present invention provide a newly multi-user computer system which no extra hardware is necessary for the PC.

SUMMARY OF THE INVENTION

Based-on the shortcomings of the above-mentioned, an objective of the present invention is to provide a multi-user computer system, wherein two users may use the identical personal computer (PC) with difference login.

Another objective of the present invention is to provide a multi-user computer system, wherein the secondary PC can be a standalone virtual computer which is connected to a monitor (or a touch screen display), a keyboard and a mouse.

Yet another objective of the present invention is to provide a multi-user computer system, wherein wireless connection is implemented between a real PC and a secondary (virtual) PC, and no extra hardware is necessary for the secondary PC.

According to an aspect of the present invention, it provides a multi-user computer system, comprising a master computer with a first wireless module, a USB driver, a virtual graphic driver, a virtual audio driver and a user mode application. At least one virtual computer is included, wherein the at least one virtual comprises a second wireless module for communicating with the first wireless module, a connection interface, a video processing device and a transceiver. The first wireless module, the connection interface and the transceiver are coupled to the video processing device. The USB driver, the virtual graphic driver and the virtual audio driver are coupled to the user mode application for driving USB devices and to enable virtual image/audio data to transmit to the at least one virtual computer.

In another example, the master computer further comprises an audio card and a video card coupled to a display.

The virtual computer further comprises a memory coupled to the video processing device.

The system further comprises a mouse and a keyboard coupled to the connection interface (such as USB interface or a PS/2 interface), an audio/video interface coupled to the video processing device (or transceiver), a communication line coupled to the audio/video interface and a second display. The audio/video interface comprises a High Definition Multimedia Interface (HDMI), a DisplayPort interface, or a Video Graphics Array (VGA) interface.

The video processing device comprises a video codec and a de-compressor, wherein the video codec comprises a video decoder and a video encoder.

According to another aspect, the at least one virtual computer is coupled to the master computer via a wired connection. The wired connection comprises an Ethernet connection or a USB connection.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
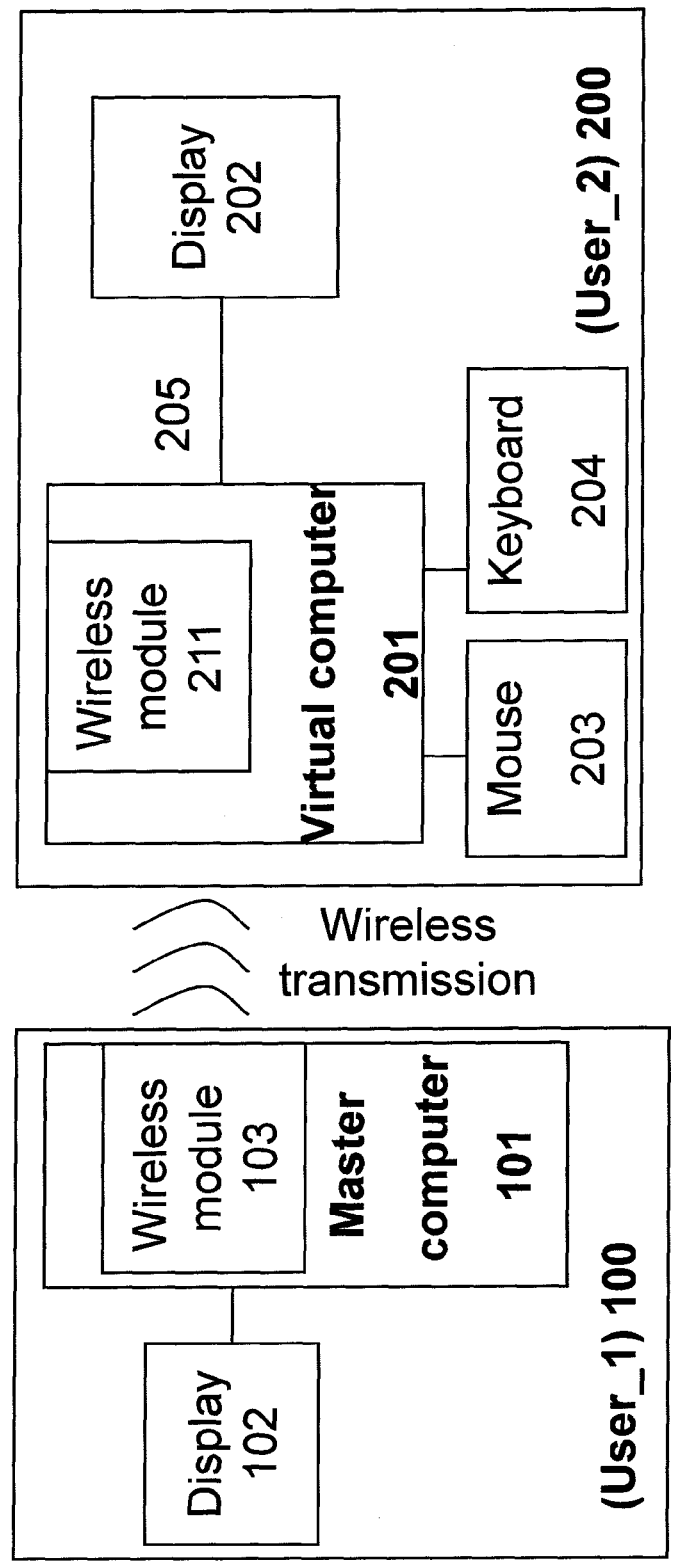
FIG. 1 illustrates a multi-user computer system according to one embodiment of the present invention.

FIG. 1 shows a multi-user computer system according to one embodiment of the present invention. The multi-user computer system comprises a master (host) computer 101 and at least one virtual computer 201. The multi-user computer system may provide for a user_1 100 and multiple user_2 200. For example, the user_1 100 is equipped with a master computer 101 and a display 102; the user_2 200 is equipped with a virtual computer 201, a display 202, a mouse 203 and a keyboard 204. The master computer 101 is a personal computer or a notebook, and the display 102 acts as a personal computer (PC) monitor for the master computer 101. The hardware layer of the master computer 101 may include the hardware in the computer, and peripheral devices (such as PC monitor) are connected to the master computer 101. Peripheral devices may be connected to the master computer 101 using the USB (Universal Serial Bus) protocol. USB is a hardware specification that allows a connection to be established between a source device and a peripheral device. The display 102 is coupled to the master computer 101 for displaying. Similarly, the display 202 is coupled to the virtual computer 201 via a communication line 205 for displaying. The communication line 205 is for example, a High Definition Multimedia Interface (HDMI) cable or a Video Graphics Array (VGA) cable. With regard to HDMI, a video information frame may be added to the video stream to provide information about the video stream's video mode. VGA cables are typically used to connect a computer to the monitor. Furthermore, in some audio/video (A/V) interfaces, such as an HDMI, a DisplayPort interface, or a VGA interface, the audio can be simultaneously transferred with the video as part of a data stream. A data stream (e.g., video and/or audio data stream) may include HDMI-based content, Digital Visual Interface (DVI)-based content, Mobile High-Definition Link (MHL)-based content, or Video Graphics Array (VGA) content; however, embodiments of the invention are not limited to HDMI, DVI, and MHL and may be used for any other type of data streams. Data that may be received or transmitted may include video data or audio-video data, such as HDMI data, and may be encrypted, such as HDCP encrypted data.

In some embodiments, the display 102, 202 may include a liquid crystal display (LCD), a plasma display, a cathode ray tube (CRT) display, or any other display technology, for displaying information or content to an end user (user_1 100, user_2 200). In some embodiments, the display 102, 202 may be utilized to display the master computer 101 programming and the virtual computer 201 programming, respectively. In some environments, the display 102, 202 may include a touch screen that is also utilized as at least a part of an input device. In various implementations, the input device may be a mouse, a keyboard, a keypad, a touch screen and stylus, a voice activated system, or other input device, or combinations of such devices. Another type of user input device that may be included is a cursor control device, such as a mouse, a trackball, or cursor direction keys for communicating direction information and command selections to the one or more processors and for controlling cursor movement on the display 102, 202. In some embodiments, the display 102, 202 may be or may include an audio device, such as a speaker for providing audio information.

The mouse 203 is coupled to the virtual computer 201 via a mouse interface thereof. The keyboard 204 is coupled to the virtual computer 201 via a keyboard interface thereof. For example, the mouse interface and the keyboard interface may be a USB connector or others connection interfaces, such as a PS/2 connector. The PS/2 connector is a 6-pin Mini-DIN connector used for connecting some keyboards and mice to a PC compatible computer system.

Especially, the master computer 101 includes a wireless module 103 and the virtual computer 201 includes a wireless module 211. The wireless modules 103 and 211 are embedded into the master computer 101 and the virtual computer 201, respectively. The wireless modules 103 and 211 may be established a network protocol from each other. The complete network protocol indicates that the network packets between the master computer 101 and the virtual computer 201 have the same mark identifier. Thus, data may be wireless transmission form the master computer 101 to the virtual computer 201 via the wireless modules 103 and 211, respectively. The virtual computer 201 may be regarded as a slave computer of the master computer 101. In other words, the master computer 101 may control the operation of the slave computer 201. For example, the user_1 100 may set a specified password for entrance (login) of the user_2 200. That is, the login password of the user_2 needs to meet the defined password for allowably entering into the master computer 101.

The master computer 101 may be provided for multiple virtual computers 201 for operation. Each of the multiple virtual computers 201 may operate independently, and share the resource of the master computer 101. For example, when a task "A" is performed on the master computer 101 which shows on the display 102, a task "B" may be performed on the virtual computer 201 shown (outputted) on the display 202 for sharing the resource of the master computer 101, simultaneously. For example, you can use the smart display to browse internet and watch video from the virtual computer 201 in your family simultaneously.

Figure 2:
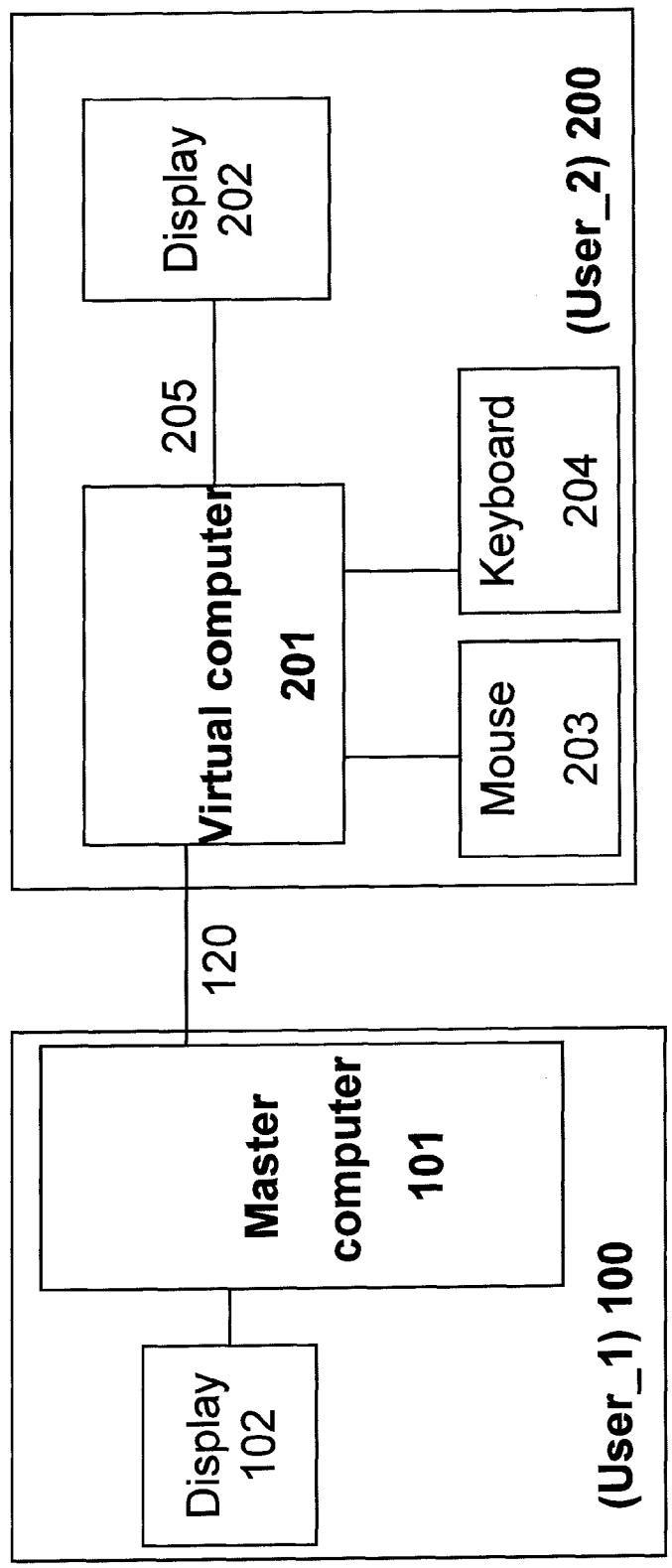
FIG. 2 illustrates a multi-user computer system according to another one embodiment of the present invention.

FIG. 2 shows a multi-user computer system according to another one embodiment of the present invention. In this embodiment, the master computer 101 is connected to the virtual computer 201 via a wired connection 120. For example, the wired connection 120 comprises a USB cable (connection) or an Ethernet cable (connection). The virtual computer 201 may be regarded as a slave computer of the master computer 101. In other words, the master computer 101 may control the operation of the slave computer 201. Others components may be referred to the FIG. 1.

Figure 3:
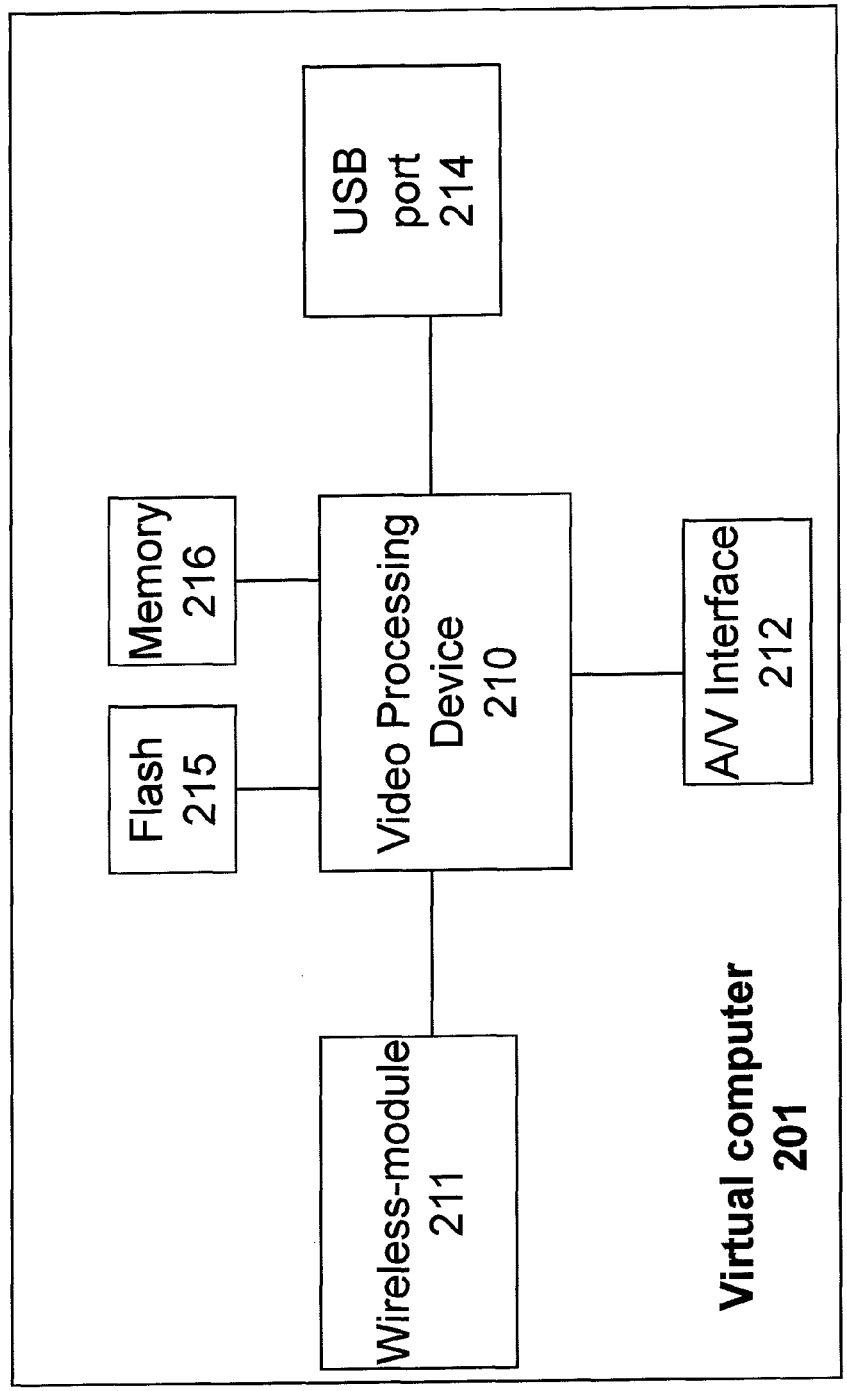
FIG. 3 illustrates a functional diagram of the wireless virtual computer according to one embodiment of the present invention.

FIG. 3 shows a functional diagram of the virtual computer according to one embodiment of the present invention. The virtual computer 201 comprises a video processing device 210, a wireless module 211, an A/V (audio/video) interface 212, a USB connector (or USB port) 214, a flash 215 and a main memory 216. In one embodiment, the wireless module 211, the A/V interface 212, USB connector 214, the flash 215 and the main memory 216 are coupled to the video processing device 210. The video processing device 210 is a receiving terminal (device). For example, the video processing device 210 may be a processor. The wireless module 211 is, for example a Wi-Fi module, Bluetooth module, 802.11 a/b/g/n module, IrDA (Infrared Data Association) module, Home RF module, or others wireless module. The A/V interface 212 comprises a High Definition Multimedia Interface (HDMI), a DisplayPort interface, or a Video Graphics Array (VGA) interface.

The virtual computer 201 further may include a USB connector (USB interface) 214, to which may be attached one or more USB compatible connections. As illustrated in FIG. 1, peripheral devices (mouse 203, keyboard 204) are connected to the virtual computer 203. In one embodiment, peripheral devices (mouse 203, keyboard 204) may be connected to the virtual computer 203 using the USB protocol. The USB protocol allows a variety of peripherals devices such as mice, keyboards, digital cameras, printers, personal media players, flash drives, smartphones and PDAs to be connected to the USB through a consistent interface. As illustrated in FIGS. 1 and 2, USB peripheral devices (USB mouse 203, USB keyboard 204) may be connected to the USB connector 124 of the virtual computer 201.

In some embodiments, the virtual computer 201 further comprises a random access memory (RAM) or other dynamic storage device as a main memory 216 for storing information and instructions to be executed by the video processing device (processor) 210. The main memory 216 may be used for storing temporary variables or other intermediate information during execution of instructions by the video processing device (processor) 210. RAM memory includes dynamic random access memory (DRAM), which requires refreshing of memory contents, and static random access memory (SRAM), which does not require refreshing contents. DRAM memory may include synchronous dynamic random access memory (SDRAM) and extended data out dynamic random access memory (EDO DRAM). In some embodiments, the virtual computer 201 also may comprise a read only memory (ROM) or other static storage device 215, such as flash memory, or other type of media/computer-readable medium suitable for storing static information and instructions for the video processing device (processor) 210. Moreover, the present invention may also be downloaded as a computer program, wherein the program may be transferred from the master computer 101 to the slave (requesting) computer 201.

Figure 4:
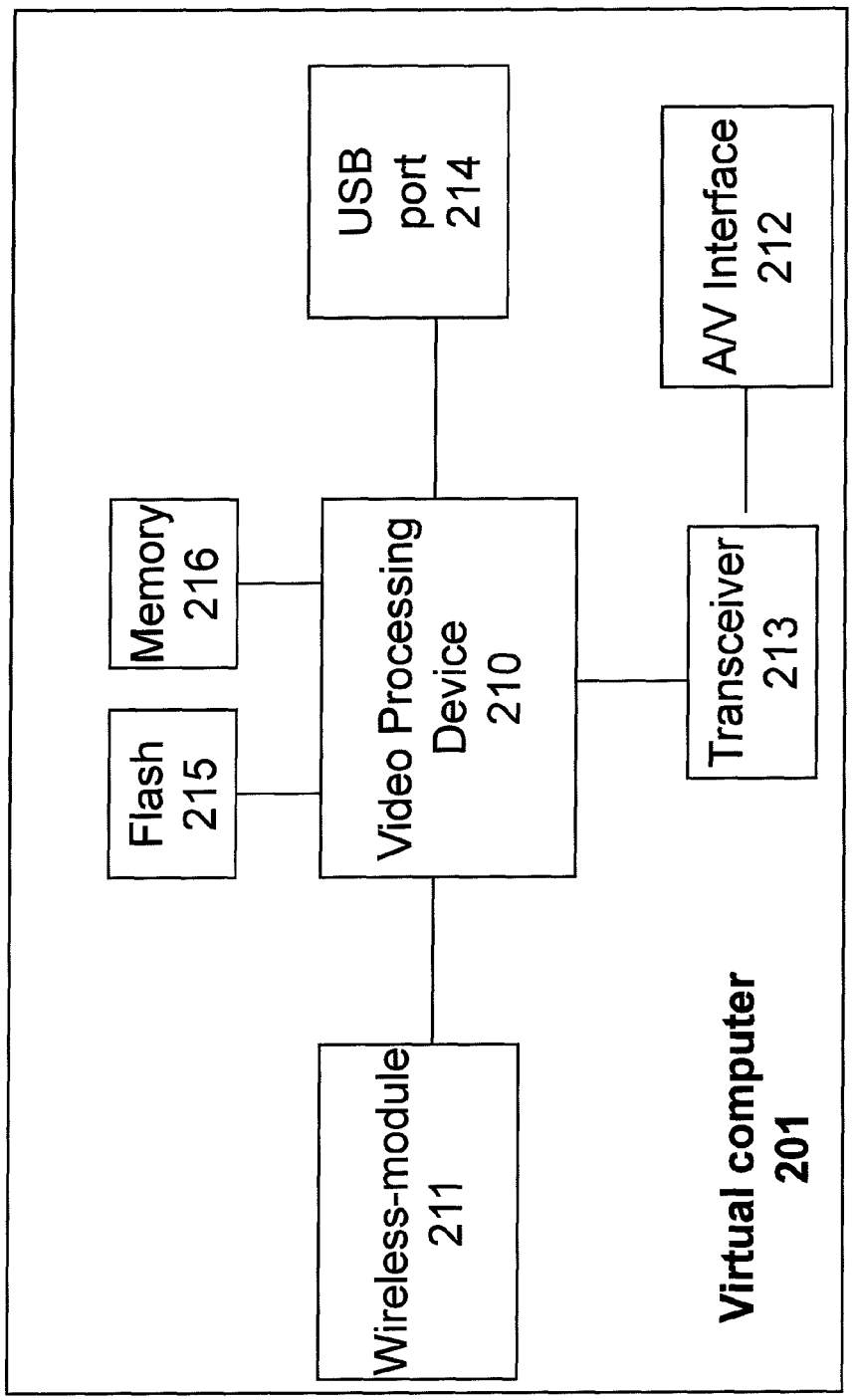
FIG. 4 illustrates a functional diagram of the wireless virtual computer according to another one embodiment of the present invention.

FIG. 4 shows a functional diagram of the virtual computer according to another one embodiment of the present invention. The virtual computer 201 further comprises a transceiver 213 coupled to the video processing device 210. The transceiver 212 includes a receiver for receiving a data signal from the video processing device 210, and a transmitter for transmitting the data signal to the A/V interface 212, respectively. The A/V interface 212 is coupled to the transceiver 213 for facilitating transmitting the audio/video information to the display 202 for displaying via the communication line 205.

Figure 5:
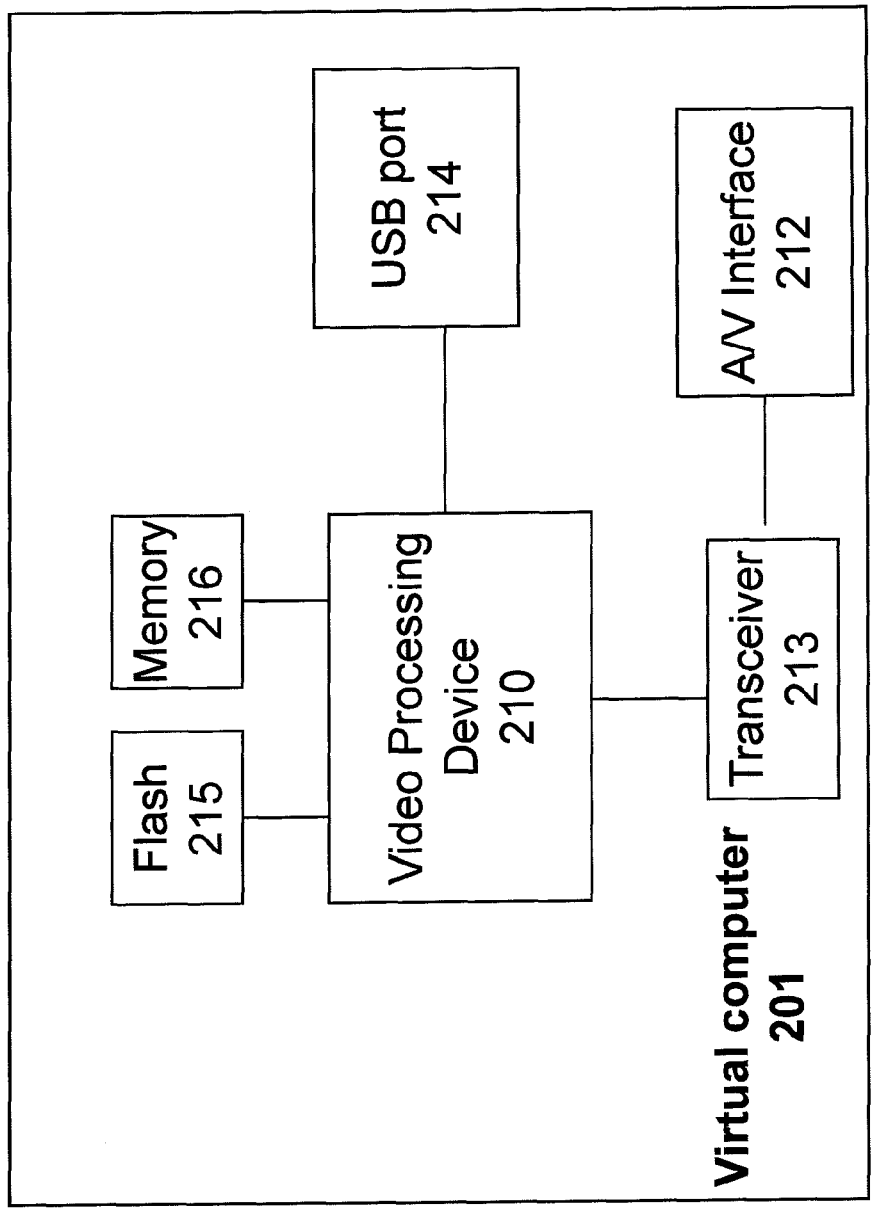
FIG. 5 illustrates a functional diagram of the wired virtual computer according to one embodiment of the present invention.
Figure 6:
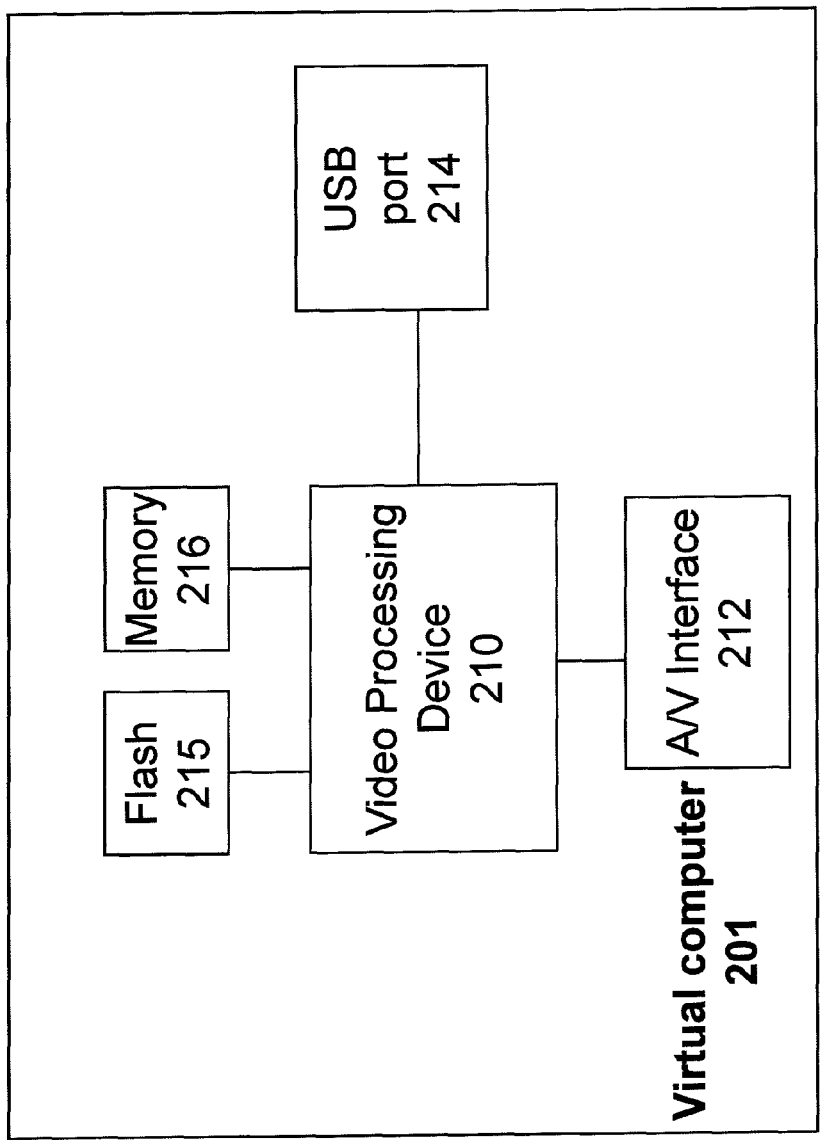
FIG. 6 illustrates a functional diagram of the wired virtual computer according to another embodiment of the present invention.

FIGS. 5 and 6 show a functional diagram of the virtual computer according to one embodiment of the present invention. In such two embodiments, the wireless module does not be required.

Figure 7:
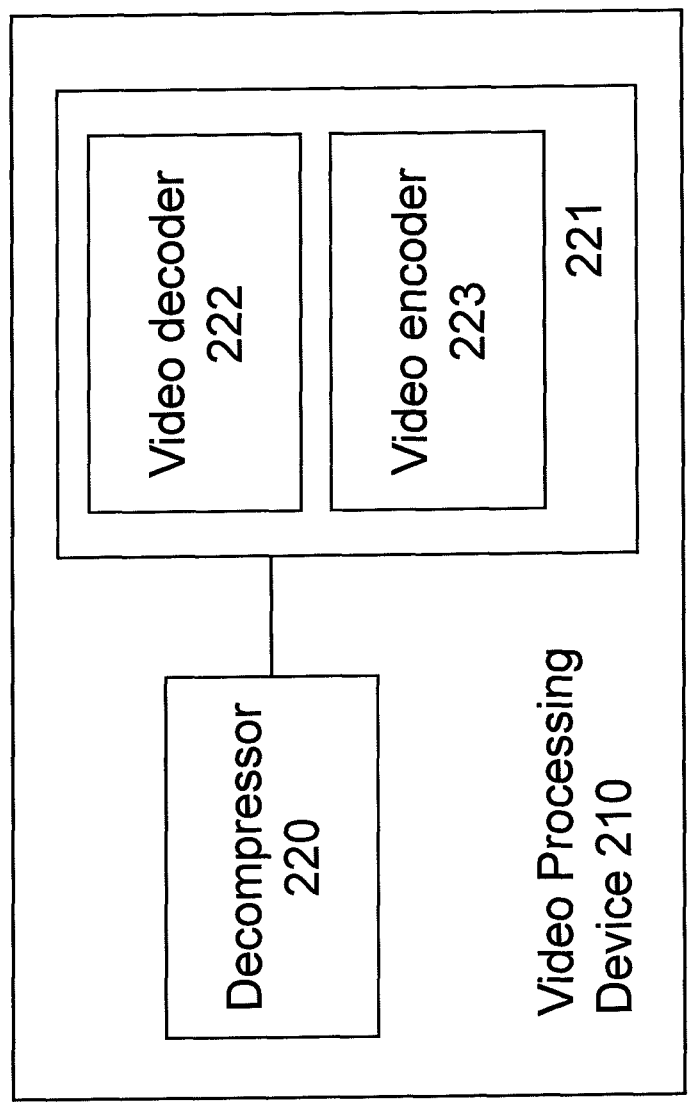
FIG. 7 illustrates a video processing device.

In some embodiments, the video processing device (video controller) 210 comprises includes a video codec 221 and a de-compressor 220, shown in FIG. 7. The video codec 221 includes a video decoder 222 and a video encoder 223. The video processing device (video controller) 210 receives an input digital audio/video data collected by the wireless module 211 and generates an output encoded digital audio/video data to the transceiver 212. In one embodiment, the input digital audio/video data may be directly decoded by the wireless module 211. The digital audio/video data can be sent as, for example, serial bit streams. The input digital audio/video data may be de-compressed by the de-compressor 221, such as according to different compression algorithms having different compression ratios or different resolutions, and then encoded by the video encoder 223. The encoded audio and video data may be transmitted to the transceiver 212 for outputting a standard signal to the display 202 for displaying via the HDMI connector 213. Each of the audio/video data includes a sequence of frames. During decoding, encoding, and displaying of the frames, certain frames may be temporarily stored in the main memory 216. The video processing device 210 can be fabricated on a single integrated circuit or may include several integrated circuits and discrete components.

Figure 8:
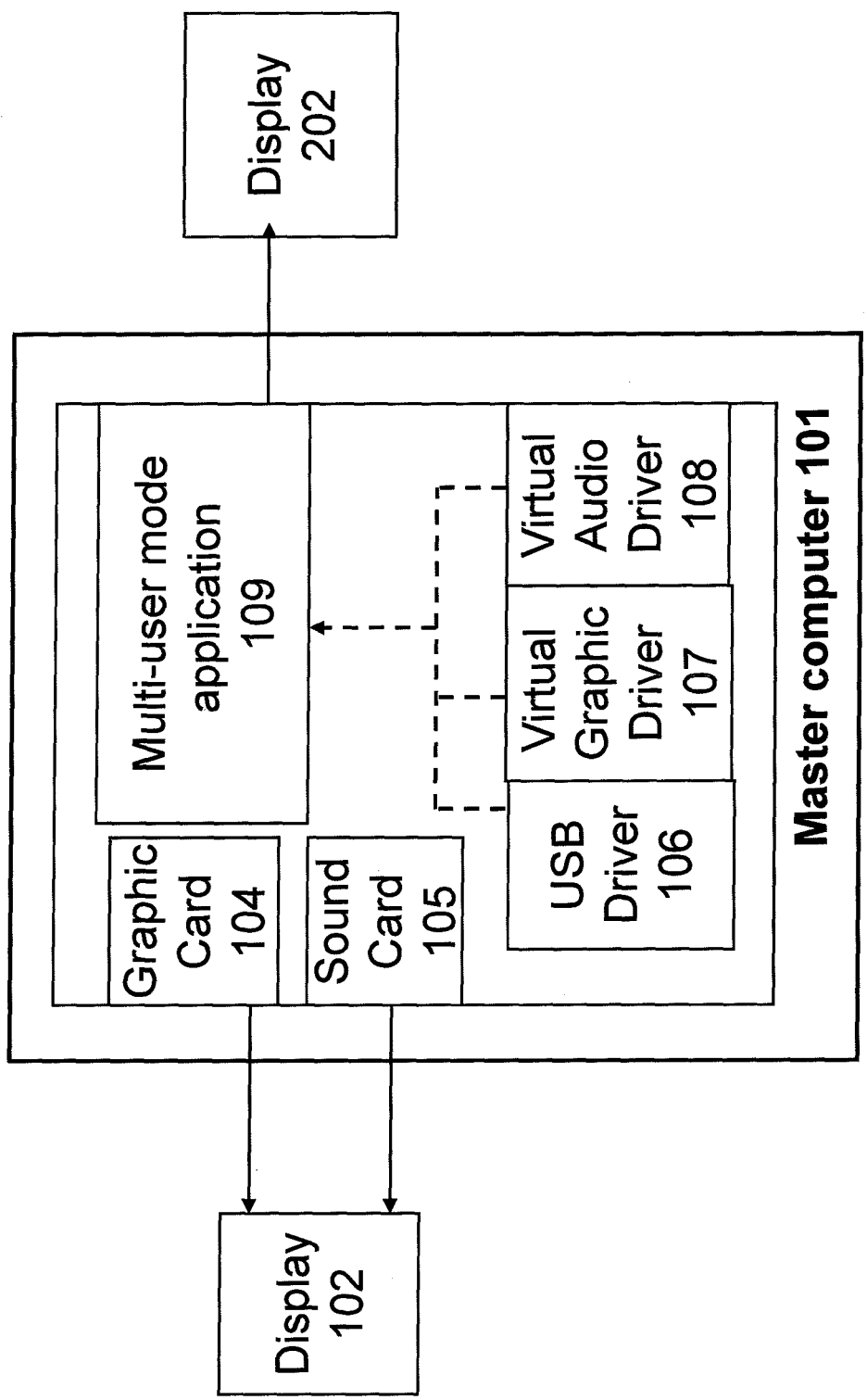
FIG. 8 illustrates a functional diagram of the master computer according to one embodiment of the present invention.

FIG. 8 shows a functional diagram of the master computer according to one embodiment of the present invention. The master computer 101 comprises a graphic card (video card) 104, a sound card (audio card) 105, a USB (PS/2) driver 106, a virtual graphic driver 107, a virtual audio driver 108 and multi-user mode applications 109 for multi-user's operations and data transmission simultaneously. The multi-user mode applications 109 running in the master computer include controlling user execution software/program for facilitating data transmission and multiple user's operation, simultaneously. Applications running in user space may be referred to as user space applications or user mode applications. In one example, the multi-user mode applications 109 may be for multi-functioning and multiplexing.

In some embodiment, the graphic card (video card) 104 has a video chip (not shown) and video RAM (not shown). In response to a rendering instruction from CPU of the master computer 101, the graphic card (video card) 104 generates a rendering image and writes it to the video RAM, and sends the image read from the video RAM to the display 102 as rendering data. Similarly, the sound card (audio card) 105 generates a rendering sound and writes it to the video RAM, and sends the sound read from the video RAM to the display 102 as rendering data.

In order for a USB driver to interface with a specific USB device, the device must be "claimed" by the driver. Because there are a variety of devices that can be connected to the computer system through USB, it is useful to have specific software modules to control I/O to specific devices. These software modules are referred to as "device drivers" or simply "drivers". A driver acts as a translator that converts the more general I/O instructions of the operating system to messages that can be understood by a specific device type with which that driver is associated. In the present invention, the USB driver 106, the virtual graphic driver 107 and the virtual audio driver 108 are required for the virtual computer 201. There are also user mode applications programmed to control USB devices (USB mouse, USB keyboard), which are referred to as "user mode USB drivers". User mode USB (PS/2) drivers run with user privilege, and thus, must communicate with USB (PS/2) devices via the multi-user mode applications 109.

Multi-user mode applications 109 are coupled to the USB (PS/2) driver 106, the virtual graphic driver 107 and the virtual audio driver 108. A USB device on the slave terminal may be claimed by the USB driver 106. For example, the USB mouse 203 and the USB keyboard 204 may be driven by the USB driver 106 of the master computer 101. The input and output to and from the computer is effectively performed by the I/O driver programs. They control the speaker, the keyboard, and the mouse respectively. The mouse has both input and output functions implemented into its driver program.

In response to a rendering instruction from the virtual computer 201, according to the command and/or controlling signal of the multi-user mode applications 109, the virtual graphic driver 107 generates a rendering virtual image data, and sends the virtual image data to the virtual computer 201, and thereby displaying by the display 202 as rendering data. Similarly, the virtual audio driver 108 may generate a rendering virtual audio data, and sends the virtual audio data to the virtual computer 201, and thereby outputting by the display 202 as rendering data.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A multi-user computer sharing system, comprising:
   a master computer providing for a first user with a first wireless module, a virtual graphic driver, a virtual audio driver and a user mode application; and
   at least one virtual computer providing for at least one second user, wherein said at least one virtual computer comprises a second wireless module for communicating with said first wireless module, a connection interface and a video processing device, wherein said at least one virtual computer is a standalone device operating independently with a different login and capable of receiving a resource from said master computer;
   wherein said second wireless module and said connection interface are coupled to said video processing device;
   wherein said virtual graphic driver and said virtual audio driver are coupled to said user mode application to enable a virtual image/audio data to transmit to said at least one virtual computer;
   wherein said user mode application of said master computer is capable of controlling user execution software/program for facilitating data transmission and said at least one virtual computer's operation;
   wherein said connection interface of said at least one virtual computer is capable of coupling to a connection device driven by a driver of said master computer, wherein said driver is coupled to said user mode application;
   wherein said at least one virtual computer is not a standalone computer;
   wherein each of said virtual at least one computer does not include a processor for executing an operating system, and therefore without sharing data to said master computer and other virtual computer except video and input data; and
   wherein said at least one virtual computer is not embedded in a standalone computer.

2. The system of claim 1, wherein said master computer further comprises a graphic card coupled to a display and an audio card coupled to said display.

3. The system of claim 1, wherein said driver of said master computer comprises a USB (Universal Serial Bus) driver.

4. The system of claim 1, wherein said virtual computer further comprises a transceiver coupled to said video processing device.

5. The system of claim 1, wherein said virtual computer further comprises a memory coupled to said video processing device.

6. The system of claim 1, wherein said connection interface includes a USB (Universal Serial Bus) interface.

7. The system of claim 1, further comprising an audio/video interface coupled to said video processing device.

8. The system of claim 7, wherein said audio/video interface comprises a High Definition Multimedia Interface (HDMI), a DisplayPort interface, or a Video Graphics Array (VGA) interface.

9. The system of claim 8, further comprising a communication line coupled to said audio/video interface and a display.

10. The system of claim 1, wherein said first wireless module and said second wireless module comprise a Wi-Fi module, a Bluetooth module, a 802.11a/b/g/n module, IrDA (Infrared Data Association) module or Home RF module.

11. A multi-user computer sharing system, comprising:
   single master computer providing for a first user with a virtual graphic driver, a virtual audio driver and a user mode application; and
   at least one virtual computer providing for at least one second user coupled to said master computer via a wired connection, wherein said at least one virtual computer comprises a connection interface and a video processing device, wherein said at least one virtual computer is a standalone device operating independently with a different login and capable of receiving a resource from said master computer;
   wherein said connection interface is coupled to said video processing device;
   wherein said virtual graphic driver and said virtual audio driver are coupled to said user mode application to enable a virtual image/audio data to transmit to said at least one virtual computer;
   wherein said user mode application of said master computer is capable of controlling user execution software/program for facilitating data transmission and said at least one virtual computer's operation;
   wherein said connection interface of said at least one virtual computer is capable of coupling to a connection device driven by a driver of said master computer, wherein said driver is coupled to said user mode application;
   wherein said at least one virtual computer is not a standalone computer;
   wherein each of said virtual at least one computer does not include a processor for executing an operating system, and therefore without sharing data to said master computer and other virtual computer except video and input data; and
   wherein said at least one virtual computer is not embedded in a standalone computer.

12. The system of claim 11, wherein said master computer further comprises a graphic card coupled to a display and an audio card coupled to said display.

13. The system of claim 11, wherein said driver of said master computer comprises a USB (Universal Serial Bus) driver.

14. The system of claim 11, wherein said virtual computer further comprises a transceiver coupled to said video processing device.

15. The system of claim 11, wherein said virtual computer further comprises a memory coupled to said video processing device.

16. The system of claim 11, wherein said connection interface includes a USB (Universal Serial Bus) interface.

17. The system of claim 11, further comprising an audio/video interface coupled to said video processing device.

18. The system of claim 17, wherein said audio/video interface comprises a High Definition Multimedia Interface (HDMI), a DisplayPort interface, or a Video Graphics Array (VGA) interface.

19. The system of claim 18, further comprising a communication line coupled to said audio/video interface and a display.

20. The system of claim 1, wherein said wired connection comprises an Ethernet connection or a USB (Universal Serial Bus) connection.

* * * * *